Feb. 10, 1942.  J. N. STREET  2,272,899
METHOD OF MAKING RADIOACTIVE COMPOSITIONS
Filed June 6, 1940  2 Sheets-Sheet 1
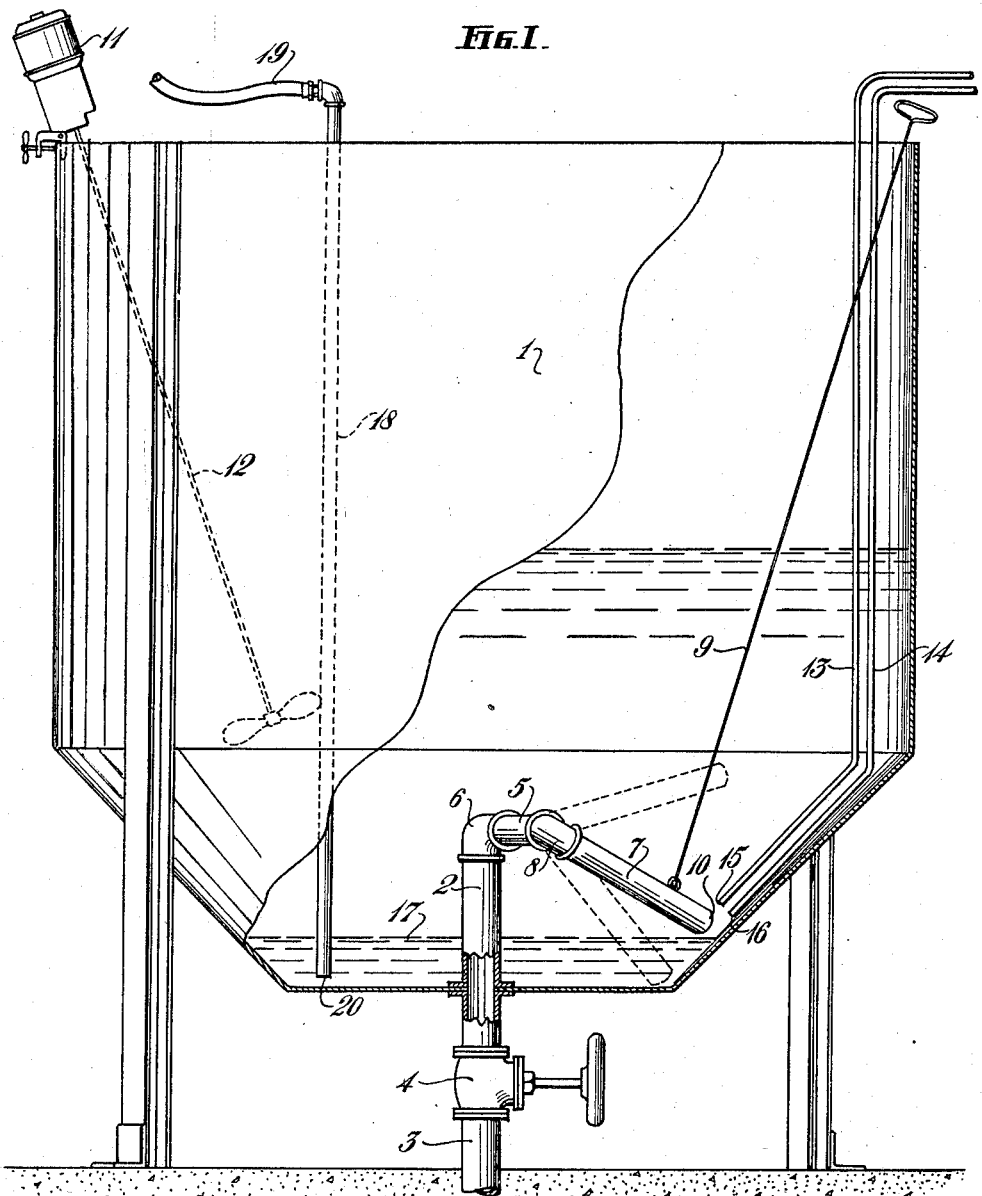
INVENTOR
John N. Street
BY
Ely & Frye
ATTORNEYS Feb. 10, 1942.   J. N. STREET   2,272,899
METHOD OF MAKING RADIOACTIVE COMPOSITIONS
Filed June 6, 1940      2 Sheets-Sheet 2
FIG. II
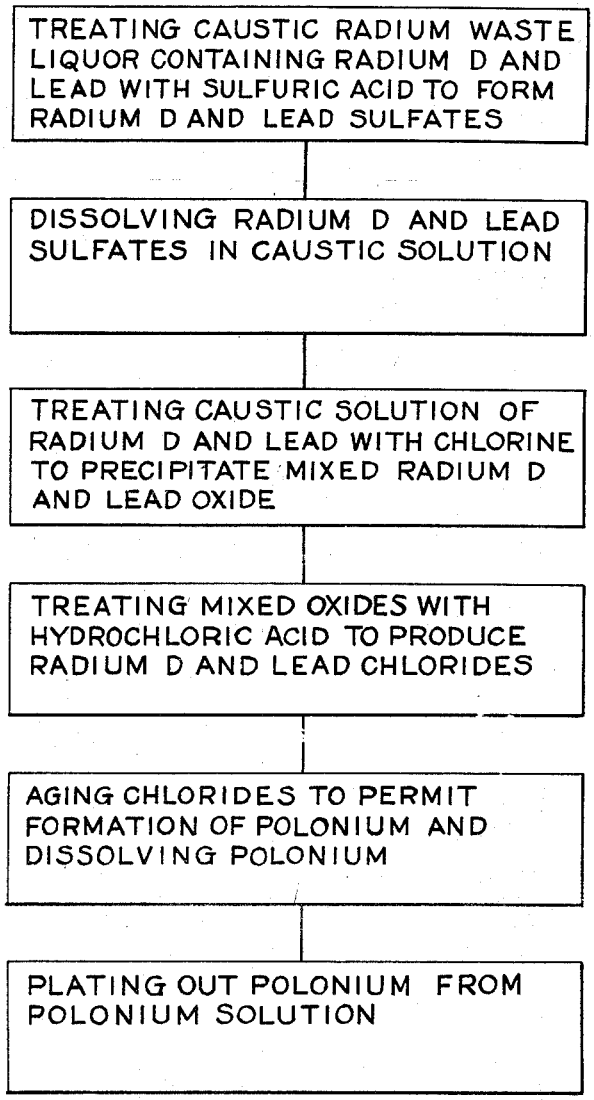
INVENTOR
JOHN N. STREET
BY
Ely & Frye
ATTORNEYS

UNITED STATES PATENT OFFICE 2,272,899

METHOD OF MAKING RADIOACTIVE COMPOSITIONS

John N. Street, Akron, Ohio, assignor to The Firestone Tire & Rubber Company, Akron, Ohio, a corporation of Ohio Application June 6, 1940, Serial No. 339,128

7 Claims. (Cl. 23—24)

This invention relates to an improved method of preparing radioactive compositions, and relates especially to an improved method of preparing compositions comprising radium D.

Radium D and polonium occur with radium in pitch-blende deposits. In the ordinary commercial recovery of radium from pitch-blende, the ore is first crushed and then roasted to decompose sulfides and carbonates and to volatilize arsenic and antimony. The roasted ore is then leached with sulfuric acid to remove the uranium. The insoluble sulfate residue contains sulfates of lead, radium, and radium D, and various impurities, notably compounds of silicon such as silica in the form of silicic acid. The sulfates of radium D and lead and much of the silica are then extracted by heating the sulfate residue with caustic soda, and filtering. The insoluble residue, containing radium sulfate, is treated by a special process to remove the radium in a commercial form. The caustic solution containing the lead and radium D, in the form of the dissolved oxides, has usually been discarded. However, the recent commercial utilization of polonium has made it desirable to recover the radium D from this caustic radium waste liquor.

Polonium is formed by the radioactive decomposition of radium D, according to the scheme shown in the table hereinbelow. Hence, a composition initially containing radium D but no polonium will later on contain polonium in proportions which increase with time up to an equilibrium value. For this reason the caustic radium waste liquor contains appreciable amounts of polonium after it has aged for a few weeks or months.

Former methods of separating radium D and polonium from the liquor were unsatisfactory. The method commonly used was to acidify the caustic waste liquor with sulfuric acid in order to precipitate radium D sulfate together with lead sulfate. This method produced an impure radium D-lead sulfate, but did not remove the polonium from the solution, and it also was objectionable in that unwanted silicic acid came down with the radium D-lead sulfate precipitate.

Polonium is obtained in a commercially usable form by first preparing a solution of a composition containing polonium and then plating the metallic polonium therefrom onto a metal. Such solution may contain dissolved compounds of radium D and lead, but should not contain colloidal material such as silicic acid, since the latter impurity greatly interferes with the plating operation. Consequently, it has been necessary to purify the radium D-lead sulfate obtained as indicated above from the waste caustic liquor of the radium refining industry before the use thereof for preparing a polonium plating solution. Such purification was an extremely inconvenient and lengthy process. One typical purification procedure consisted in first converting the sulfate to the crude, insoluble carbonate, separating the latter product and then converting it into the nitrate or acetate. The silicic acid was precipitated during the last conversion and was removed from the soluble nitrate or acetate by filtration. The soluble nitrate or acetate was then converted into a purified carbonate, suitable for conversion, preferably after aging, into the chloride for preparation of the polonium-plating solution. Since the so-purified radium D-lead carbonate contained practically no polonium, it was necessary to allow it or the chloride produced therefrom to age for several weeks or months before use in a polonium-plating solution, in order for substantial amounts of polonium to be developed from the radium D, according to the table hereinbelow.

The relations between polonium (radium F), radium D, radium, and uranium are set forth in the following table, showing the uranium-radium radioactive series and adapted from Landolt-Börnstein Physikalisch-Chemische Tabellen, fifth edition, published by Julius Springer, Berlin.

Table

| Element | Atomic Wt. | Atomic No. | Half life | Strong rays | Weak rays |
|---|---|---|---|---|---|
| Uranium I | 238 | 92 | 4.4×10⁹ years | Alpha | |
| Uranium X₁ | 234 | 90 | 24.5 days | Beta | |
| Uranium X₂ | 234 | 91 | 1.17 min | do | Gamma. |
| Uranium Z | 234 | 91 | 6.7 hrs | do | |
| Uranium II | 234 | 92 | 1.7×10⁵ years | Alpha | |
| Ionium | 230 | 90 | 85,000 years | do | |
| Radium | 226 | 88 | 1690 years | do | Beta and gamma. |
| Radon | 222 | 86 | 3.83 days | do | |
| Radium A | 218 | 84 | 3.05 min | do | |
| Radium B | 214 | 82 | 26.8 min | Beta | Gamma. |
| Radium C | 214 | 83 | 19.7 min | Beta and gamma. | |
| Radium C' | 214 | 84 | 0.0002 sec | Alpha | |
| Radium C'' | 210 | 81 | 1.3 min | Beta | |
| Radium D | 210 | 82 | 22.3 years | | Beta and gamma. |
| Radium E | 210 | 83 | 5.0 days | Beta | |
| Radium F (polonium) | 210 | 84 | 138 days | Alpha | Gamma. |
| Radium G (lead) | 206 | 83 | Stable | | |

A primary object of the present invention is to provide a method of separating a useful composition comprising radium D in one step from a caustic solution containing a dissolved compound of radium D.

Another object is to provide a method for separating a composition comprising radium D substantially free from silicious material from the caustic radium waste liquor resulting from the commercial extraction of radium from its ores.

Another object is to provide an improved method for purifying a composition comprising radium D and polonium without any substantial loss of polonium therefrom.

A further object is to provide a method of converting an impure composition comprising radium D into a purified composition comprising a soluble salt of radium D.

Further objects will be manifest from the specification, reference being had to the accompanying drawings, in which Figure I is an elevation, partly in section, of apparatus suitable for carrying out the process of the present invention; and Figure II is a flow sheet illustrating one example of the method of the invention.

According to the present invention an insoluble compound of radium D is precipitated by treating a caustic solution comprising radium D with an oxidizing agent; any polonium present in the caustic solution has been found to precipitate concurrently with the insoluble radium D compound. For example, by treating caustic radium waste liquor with chlorine, a precipitate comprising substantially the oxides of radium D and lead is obtained; whatever polonium was present in the liquor accompanies the precipitate and is thought to be substantially in the form of an oxide. Also, an impure composition comprising polonium and radium D may be purified from undesirable silicious material and other impurities by first dissolving the impure composition in an aqueous caustic solution and then treating the solution with chlorine, or other suitable oxidizing agent, in order to form a precipitate comprising compounds of radium D and polonium. It is thought that the radium D exists as an oxide in the precipitate from the caustic solution, or substantially as an oxide. However, it may exist to a greater or less extent as a hydroxide or a mixed compound, such as an oxychloride. Throughout the specification and claims, therefore, the expression "substantially as an oxide" is meant to include the radium D compound present in the precipitate formed on treating a caustic solution comprising this element with an oxidizing agent.

It is to be understood that the precise chemical structure of the compounds of radium D and polonium present in the purified precipitate is unimportant so far as the present invention is concerned. The polonium may not form an independent insoluble compound, but merely be adsorbed in some form or other by the insoluble radium D and lead compounds.

By means of the present invention a shortcoming of the prior practice has been eliminated in a very simple and effective manner. The silicious material dissolved in the caustic radium waste liquor, or in a caustic solution of an impure composition comprising radium D and polonium, is not precipitated when the caustic solution is treated with an oxidizing agent, so long as the solution is maintained basic is character. On separating the precipitate from the caustic liquor, therefore, a radium D composition is obtained free from silicious impurities.

A second important advantage of the method of the present invention over the prior practices is that any polonium initially present accompanies radium D when the latter is precipitated from the caustic solution. The prior practice of precipitating radium D from caustic radium waste liquor by acidification of the liquor with sulfuric acid left practically all of the polonium precipitated on the inner walls of the container or in solution, the solution being subsequently discarded. The method of the present invention, however, removes the polonium as well as the radium D quantitatively from the caustic solution.

A further advantage of the present method is that ordinary iron containers may be used for the precipitation, it being unnecessary to use special equipment, such as glass-lined tanks. This advantage results from the fact that the polonium does not readily deposit onto a surface when it is in a strongly basic solution. However, when polonium is in acid solution it readily plates upon nearly all base metals by contact. Thus, when the caustic waste liquor was acidified in an iron tank with sulfuric acid according to the former practice, much polonium deposited upon the inside surface of the iron tank and was thereby wasted.

The following examples are given for illustrative purposes only, and are not to be construed as limiting the invention thereto.

*Example I*

One example of the method of the invention is illustrated by the flow sheet of Figure II. Impure radium D-lead sulfate is produced by treating caustic radium waste liquor, containing radium D and lead, with excess sulfuric acid and separating the insoluble sulfate from the resulting mixture. The acid insoluble sulfate, which contains silicic acid and other impurities, is then dissolved in a caustic solution. On treating the caustic solution with an oxidizing agent, such as chlorine, the radium D and lead are precipitated from the solution as mixed oxides substantially free from impurities, such as silicic acid. The precipitated oxides are separated from the solution and are then suitable for use in a process for producing a commercially useful polonium preparation. Thus, the mixed radium D and lead oxides may be treated with hydrochloric acid to produce radium D and lead chlorides; the latter may be allowed to age in order for polonium to form from the radium D, according to the scheme shown in Table I above; the aged chlorides may be treated to form a polonium solution therefrom; and then polonium may be plated from the solution onto a metal in order to produce a commercially usable polonium plated material.

The present method is preferably carried out commercially in a reaction tank such as that shown in Figure I, in which 1 is a cylindrical iron tank open at the top and equipped with a drain pipe 2 situated in the bottom thereof and in communicating relation with an outer pipe 3 and a valve 4. Inside the tank, pipe 2 is rigidly attached at a right angle to a pipe 5 by means of an elbow 6. Pipe 5, in turn, is non-rigidly attached at a right angle to an open-ended pipe 7 by means of an elbow 8, so that the pipe 7 may be manually moved up or down to various positions 7', 7" by means of a handle 9 attached to pipe 7 at a point near the open end 10 thereof. Attached to the top of the cylindrical sidewall of the tank is a stirring motor 11 carrying a steel stirring shaft 12 extending downwardly in the tank and at a slight angle with respect to the sidewall. Open-ended iron pipes 13 and 14 enter the open top of the tank and extend downwardly in the tank to points 15 and 16, respectively, near the bottom thereof.

With valve 4 closed and pipe 7 slantingly positioned with its open end downward, approximately 420 gallons of water are placed in tank 1, suitably of 800 gallon capacity. With the stirring motor 11 operating, 600 pounds of commercial 96 percent sodium hydroxide are gradually added to the water in the tank, and stirring is continued until the caustic is completely dissolved. The caustic solution so produced is heated by the introduction of steam therein through tube 13. With the stirrer operating and while the solution is being heated, 350 pounds of impure radium D-lead sulfate produced as described hereinabove, are gradually sifted into the caustic solution. Steam is introduced through pipe 13 until the water mixture begins to boil, and then is continued until the solution is clear (approximately one hour); that is, until all of the sulfate has been converted into oxides soluble in the caustic solution and the various impurities, such as silica, have also dissolved.

Chlorine gas is then introduced through pipe 14 beneath the surface of the boiling solution in order to form the insoluble higher oxides of lead and radium D. The solution is stirred and steam is passed into it during the introduction of the chlorine. After about 5 pounds of chlorine have been absorbed by the solution a bright red precipitate forms, which shows a tendency to form a colloidal solution. The color of the precipitate changes to a reddish-brown after the introduction of about 40 pounds of chlorine, and then to a dark brown after the introduction of about 43 pounds of chlorine. The precipitation reaction being at an end, the introduction of chlorine and steam is discontinued and the stirrer is stopped. The hot mixture is allowed to cool and settle over night.

With the pipe 7 positioned so that the open end 10 is just above the top of the heavy precipitate 17, valve 4 is opened to allow the clear supernatant liquor to drain off and be discarded. Then the valve is closed and an open-ended iron pipe 18, attached at the top through a flexible hose 19 to a source (not shown) of water under pressure, is inserted into the tank so that the bottom end 20 of the pipe rests in the body of the precipitate. Water is next forced through pipe 18 into the precipitate, the pipe being manually moved in the manner of a stirring rod, so as to agitate the entire mass of the heavy precipitate by the stream of water. If desired, the resulting slurry may be further stirred by means of the mechanical stirrer, above described. After ample time has been allowed for the wash water to contact all of the precipitate, the introduction of water and the stirring are discontinued. Then the washed precipitate is allowed to settle, and the wash water is drained through pipes 7, 5, 2, 3 and valve 4. The precipitate is washed in the manner just described about three times or until the last wash water is substantially neutral to litmus. Then the moist precipitate is scooped from the tank and dried, suitably in an oven at 70-100° C. The dry yield is 270 pounds of a dark brown powder thought to be substantially lead dioxide containing practically all of the radium D and polonium originally present in the starting material (radium D-lead sulfate) in the form of their oxides. It is not necessary to dry the moist precipitate if it is to be used, as is described below, for the preparation of a salt suitable for making up a polonium plating solution.

*Example II*

The present method has also been applied to the caustic radium waste liquor in a manner similar to that set forth in the above example, except that two steps of that example are eliminated, that is, the step of treating the waste liquor with sulfuric acid to precipitate radium D and lead sulfates and the step of dissolving the sulfate precipitate in caustic solution prior to the treatment with an oxidizing agent. Thus, by treating caustic radium waste liquor directly with chlorine, a precipitate comprising substantially the oxides of radium D and lead is obtained. Whatever polonium present in the liquor accompanies the precipitate and is thought to be substantially in the form of an oxide. This method results in a composition with an increased polonium content since this is not lost in converting to the sulfate. The precipitate obtained is substantially free from impurities which might be undesirable in a subsequent operation for plating polonium.

Other oxidizing agents than chlorine may also be effectively used for treating the caustic solution containing radium D and polonium. Other oxidizing agents equivalent to chlorine in the present method include bromine, iodine, hypochlorites, chlorites, permanganates and ferricyanides. Chlorine is preferred because of its cheapness, availability and ease of handling.

The mixed oxide precipitate from the caustic liquor finds commercial use in the preparation of a salt suitable for making up a polonium-plating solution. The salt generally desired is the chloride, although other salts may be used. In order to obtain the desired salt it is only necessary to treat the mixed oxide with the appropriate acid, (for example, hydrochloric acid for producing the chloride) either concentrated or dilute, as desired. The acid treatment is preferably carried out in a glass-lined tank in order to prevent the loss of polonium by deposition thereof on the tank walls from the acid solution.

Modification may be resorted to and chemical equivalents may be substituted for the agents specified in the above example without departing from the spirit and the scope of the present invention, as defined in the appended claims.

What is claimed is:

1. The method of preparing a composition containing soluble salts of radium D and polonium substantially free from compounds of silicon in a condition satisfactory for direct use in a polonium-plating solution, comprising treating a caustic solution containing in solution compounds of silicon, radium D and polonium with chlorine to form a precipitate, separating the precipitate so produced from the solution, the separated precipitate comprising purified compounds of radium D and polonium, and then treating the precipitate with an acid to form a composition comprising soluble radium D and polonium salts.

2. The method of preparing a composition containing soluble salts of radium D and polonium in a condition satisfactory for direct use in a polonium-plating solution, comprising treating a caustic solution containing in solution compounds of silicon, radium D and polonium with an oxidizing agent to form a precipitate, separating the precipitate so produced from the solution, the separated precipitate comprising purified compounds of radium D and polonium substantially free from compounds of silicon, and then treating the precipitate so produced with an acid to form a composition comprising soluble radium D and polonium salts.

3. The method of purifying a composition containing compounds of silicon, radium D and polonium, comprising treating the composition with a caustic solution to dissolve the compounds, treating the solution so produced with an oxidizing agent to form a precipitate, and then separating the said precipitate from the solution, the separated precipitate comprising purified compounds of radium D and polonium substantially free from compounds of silicon.

4. The method of recovering radium D and polonium from caustic radium waste liquor, containing compounds of silicon, radium D and polonium, comprising treating said liquor with chlorine to form a precipitate comprising compounds of radium D and polonium, the radium D being substantially in the form of an oxide, and then separating the precipitate so produced from the solution, the precipitate being substantially free from silicious material.

5. The method of recovering radium D and polonium from caustic radium waste liquor, containing compounds of silicon, radium D and polonium, comprising treating said liquor with an oxidizing agent to form a precipitate, and then separating the precipitate so produced from the solution, the separated precipitate comprising compounds of radium D and polonium substantially free from compounds of silicon.

6. The method of preparing a composition containing compounds of radium D substantially free from compounds of silicon, which method comprises treating caustic radium waste liquor, containing compounds of silicon, lead, radium D and polonium with sulfuric acid to precipitate radium D and lead sulfates, separating the precipitated sulfates so produced from the solution, dissolving the sulfates in aqueous caustic solution, then treating the caustic solution with an oxidizing agent to precipitate compounds of radium D and lead, and finally separating the radium D and lead compounds from the solution.

7. The method of preparing a composition containing a purified compound of radium D, which method comprises treating a sulfate residue containing sulfates of lead, radium and radium D and compounds of silicon with a caustic solution to produce a solution containing substantially all of the compounds of radium D and lead and substantially none of the radium sulfate originally present in said sulfate residue, but containing compounds of silicon, treating the solution so produced with an oxidizing agent to form a precipitate, separating the said precipitate from the solution, the separated precipitate containing compounds of radium D and lead substantially free from compounds of silicon.

JOHN N. STREET.

CERTIFICATE OF CORRECTION.

Patent No. 2,272,899. February 10, 1942.

JOHN N. STREET.

It is hereby certified that error appears in the printed specification of the above numbered patent requiring correction as follows: Page 3, second column, line 57, claim 1, strike out "substantially free from compounds of silicon" and insert the same after "polonium", line 65, same claim; page 4, first column, line 5, claim 2, strike out "so produced"; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.

CERTIFICATE OF CORRECTION.

Patent No. 2,272,899.                                      February 10, 1942.

JOHN N. STREET.

It is hereby certified that error appears in the printed specification of the above numbered patent requiring correction as follows: Page 3, second column, line 57, claim 1, strike out "substantially free from compounds of silicon" and insert the same after "polonium", line 65, same claim; page 4, first column, line 5, claim 2, strike out "so produced"; and that the said Letters Patent should be read with this correction therein that the same may conform to the record of the case in the Patent Office.

Signed and sealed this 23rd day of June, A. D. 1942.

(Seal)                                 Henry Van Arsdale,
                                         Acting Commissioner of Patents.